Nov. 10, 1931.  J. L. DRAKE  1,831,622
APPARATUS FOR PRODUCING SHEET GLASS
Filed May 19, 1927
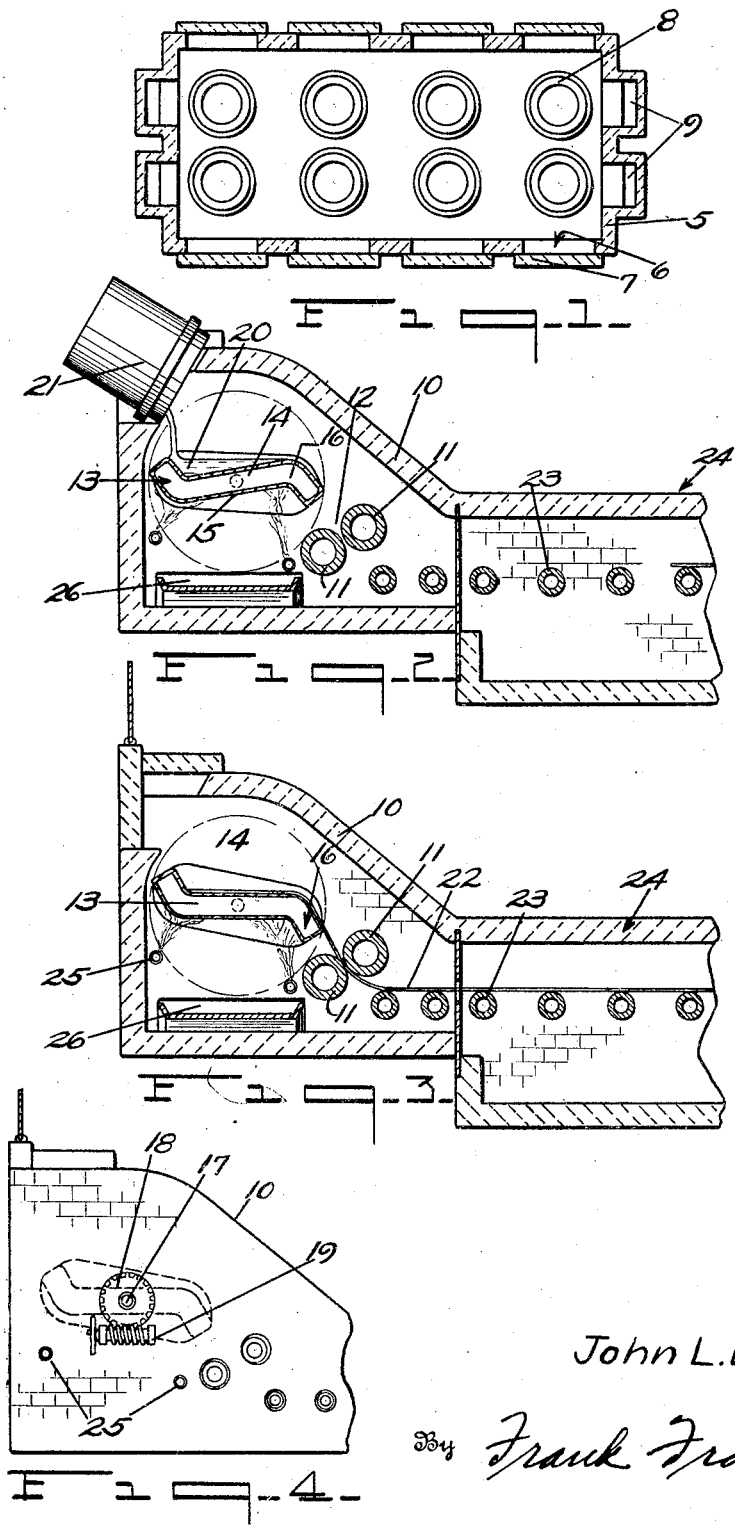
Inventor
John L. Drake
By Frank Fraser
Attorney Patented Nov. 10, 1931

1,831,622

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR PRODUCING SHEET GLASS

Application filed May 19, 1927. Serial No. 192,514.

The present invention relates to a process and apparatus for producing sheet glass.

An important object of the invention is to provide in sheet glass apparatus, a slab having two substantially identical sides, said slab being mounted in a manner that first one side and then the other may be used to produce sheet glass.

Another object of the invention is to provide means whereby molten glass may be melted and refined in a receptacle, after which it is transferred to a pivoted slab from which the molten glass is removed in sheet form.

Still another object of the invention is to provide means of this nature including a pivoted slab arranged in a manner that a mass of molten glass may be created on one side thereof, after which the slab is tilted to permit removal of the glass in sheet form, the slab then being turned over so that a second mass of glass can be created on the side opposite to the first side, while in the meantime the waste glass can be removed from the side first used.

A further and important object of the invention is to provide in sheet glass apparatus, a slab and a pair of sheet forming rolls arranged adjacent the slab in a manner that molten glass may be flowed or drawn from the slab and passed between said rolls to produce a flat sheet of predetermined thickness.

Other objects and advantages of the invention will become more apparent during the course of the following description.

In the drawings wherein like numerals are employed to designate like parts throughout the same, Fig. 1 is a diagrammatic plan view illustrating an apparatus capable of producing molten glass.

Fig. 2 is a fragmentary vertical longitudinal section through the apparatus illustrating transfer of molten glass from a melting receptacle to a working slab.

Fig. 3 is a similar view illustrating the slab in an operative position, and

Fig. 4 is a fragmentary detail.

The numeral 5 designates a tank provided with a plurality of openings 6 ordinarily closed by means of doors or the like 7. A plurality of movable pots 8 are adapted to be arranged within said furnace, the pots being placed within and removed from said furnace through the openings 6. Suitable glass batch ingredients may be deposited in the pots 8 where they are subjected to high temperatures created by means of the heating means 9. After a sufficient quantity of glass has been melted in the pots 8, the temperature of the furnace is preferably so controlled that the glass in the pots will be permitted to become completely refined. Ordinarily, a considerable length of time should be permitted for the proper refining of the glass so that together with the proper time element and temperature control, a high quality of glass will be formed in said pots.

In Fig. 2 is illustrated a sheet forming mechanism comprising a housing 10 having arranged therein rotatable members 11 positioned in a manner to create a sheet forming pass 12.

Arranged in proximity to the rolls 11 is a pivoted slab 13 having two substantially identical sides 14. The ends of the slab 13 are curved to form the extensions 16. The slab may be mounted on suitable trunnions 17 illustrated in Fig. 4, and by means of a gear 18 operable through the means 19 the slab may be rotated.

In Fig. 2 the slab is in a position such that a mass of molten glass 20 may be deposited thereon from the pot 21. The size of the pot and the slab is preferably such that the entire pot full may be poured upon the slab at one time, although of course the invention is in no way restricted to the size of either the pot or the slab. After the desired amount of molten glass has been deposited upon the slab 13, it is moved so that a flow of glass will pass between rolls 11 to create a sheet of glass 22, the thickness of said sheet being dependent upon the distance between the rolls. The sheet 12 may be conveyed by means of the rolls or the like 23 into an annealing leer 24. After most of the glass has been removed from the slab 13 in sheet form, it is rotated so that the side which has been uppermost during the sheet forming operation is underneath where it may be subjected to the action of gas burners or the like 25. The burners 25 are applied to the slab in a manner that waste glass will be removed therefrom. The glass will melt and drop into a receptacle 26 contained in the bottom of the compartment 10. From time to time the receptacle 26 may be removed or replaced so that the waste glass can be easily taken from said compartment 10.

Simultaneously, with the removal of the waste glass from the bottom of the slab a new deposit is made upon the upper exposed side of the slab. The slab is tilted as before mentioned to produce a sheet of glass, and this operation is repeated as often as desired. It will thus be seen that while one side is being used to support a mass of molten glass, the opposite side is being cleaned and prepared for the next flow.

The slab 13 and the rolls 11 are preferably formed from a non-corrosive metal although the invention is not restricted to the use of any particular material. Due to the fact that the molten glass has been completely refined before it is placed upon the slab, the finished sheet will be, practically speaking, free from seeds, blisters and similar glass defects. Due to the fine quality of the sheet 22 it is particularly useful as a plate glass blank or blanks. When used as a plate glass blank of course, it is subjected to surfacing after it is removed from the leer 24.

The thickness of the sheet may be controlled by the inclination of the slab 13 and the distance between the rolls 11. The rolls may be internally cooled or heated by air, water or other temperature control mediums. The rolls are preferably positively driven. All the driving means have been left out for the sake of clearness.

Due to the fact that the slab is surrounded by a suitable housing, the glass 20 will not become unduly chilled before it is formed into a sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a slab having two substantially identical sides, each end of the slab terminating in an angular extension, means for turning the slab over, means for depositing molten glass on the upturned side of the slab, and means for forming said molten glass into a sheet.

2. In sheet glass apparatus, a slab having two substantially identical sides, each end of the slab terminating in an angular extension, means for turning the slab over, means for depositing molten glass on the upturned side of the slab, and means for rolling said molten glass into a sheet.

3. In sheet glass apparatus, a slab having two substantially identical sides, each end of the slab terminating in an angular extension, means for pivotally mounting the slab so that first one side and then the other may be upturned, means for depositing a mass of molten glass on the upturned side of the slab, and means for rolling the molten glass into a sheet.

4. In sheet glass apparatus, a slab having two substantially identical sides, each end of the slab terminating in an angular extension, means for depositing a mass of molten glass on the upturned side of the slab, a pair of rolls arranged to create a sheet forming pass mounted in proximity to the slab, and means for tilting said slab whereby the molten glass flows therefrom and through the sheet forming pass where it is rolled into a sheet.

5. In sheet glass apparatus, a slab having two substantially identical sides, each end of the slab terminating in an angular extension, means for depositing a mass of molten glass on the upturned side of the slab, a pair of rolls arranged to create a sheet forming pass mounted in proximity to the slab, means for tilting said slab whereby the molten glass flows therefrom and through the sheet forming pass where it is rolled into a sheet, and means for cleaning the underside of the slab.

6. In sheet glass apparatus, a slab having two substantially identical sides, each end of the slab terminating in an angular extension, means for depositing a mass of molten glass on the upturned side of the slab, a pair of rolls arranged to create a sheet forming pass mounted in proximity to the slab, means for tilting said slab whereby the molten glass flows therefrom and through the sheet forming pass where it is rolled into a sheet, and side members carried by the slab to retain the molten glass thereon.

7. In sheet glass apparatus, a slab having two substantially identical sides, each end thereof terminating in an angular extension, the extensions pointing in opposite directions, means for pivotally mounting the slab so that it may be completely revolved, means for depositing molten glass on the upturned surface of the slab, said slab being positioned in a manner that a pocket is formed, one of the extensions serving to retain the molten glass on the slab and the other of said extensions acting as an overflow lip as the slab is revolved to flow the glass therefrom, and means for forming a sheet from the glass flowing over said extension.

8. In sheet glass apparatus, a slab having two substantially identical sides, each end thereof terminating in an angular extension, the extensions pointing in opposite directions, means for pivotally mounting the slab so that it may be completely revolved, means for depositing molten glass on the upturned surface of the slab, said slab being positioned in a manner that a pocket is formed, one of the extensions serving to retain the molten glass on the slab and the other of said extensions acting as an overflow lip as the slab is revolved to flow the glass therefrom, and means for rolling a sheet from the glass flowing over said extension.

9. In sheet glass apparatus, a slab having two substantially identical sides, each end thereof terminating in an angular extension, the extensions pointing in opposite directions, means for pivotally mounting the slab so that it may be completely revolved, means for depositing molten glass on the upturned surface of the slab, said slab being positioned in a manner that a pocket is formed, one of the extensions serving to retain the molten glass on the slab and the other of said extensions acting as an overflow lip as the slab is revolved to flow the glass therefrom, means for forming a sheet from the glass flowing over said extension, and means for cleaning the underside of the slab while said sheet is being formed.

Signed at Toledo, in the county of Lucas and State of Ohio, this 17th day of May, 1927.

JOHN L. DRAKE.